United States Patent [19]

Sharp et al.

[11] Patent Number: 4,976,171
[45] Date of Patent: Dec. 11, 1990

[54] TRANSMISSION SHIFTER TO OPERATOR CONTROLLED MECHANISM INTERLOCK

[75] Inventors: Harold L. Sharp, Union Lake; Charles E. Kinkade, Dryden, both of Mich.

[73] Assignee: General Motors Corporation, Detroit, Mich.

[21] Appl. No.: 419,307

[22] Filed: Oct. 10, 1989

[51] Int. Cl.5 .............................................. B60R 41/04
[52] U.S. Cl. ...................................... 74/878; 70/248; 192/4 A
[58] Field of Search ....................... 74/878, 483, 501.6, 74/502.5, 502.6; 192/4 A; 70/245, 247, 248

[56] References Cited

U.S. PATENT DOCUMENTS

| | | | |
|---|---|---|---|
| 3,930,555 | 1/1976 | Iijima | 180/82 A |
| 3,939,939 | 2/1976 | Okazaki | 180/82 C |
| 3,939,940 | 2/1976 | Sesabe et al. | 180/82 C |
| 3,942,614 | 3/1976 | Thompson | 192/4 A |
| 3,948,339 | 4/1976 | Iwanaga | 180/82 C |
| 3,958,658 | 5/1976 | Miyauchi et al. | 180/82 C |
| 4,187,935 | 2/1980 | O'Hern | 192/4 A |
| 4,232,571 | 11/1980 | Kimberlin | 74/878 |
| 4,235,123 | 11/1980 | Simancik et al. | 74/878 X |
| 4,249,404 | 2/1981 | Kimberlin | 74/878 X |
| 4,270,624 | 6/1981 | Jessop | 74/878 X |
| 4,296,847 | 10/1981 | Arndt | 192/4 A |
| 4,474,085 | 10/1984 | DeVogelaere | 74/475 X |
| 4,660,443 | 4/1987 | Simancik | 74/878 |
| 4,676,119 | 6/1987 | Spease | 74/502.6 |
| 4,724,722 | 2/1988 | Beauch et al. | 70/248 X |
| 4,841,806 | 6/1989 | Spease | 74/502.6 X |
| 4,887,702 | 12/1989 | Ratke et al. | 192/4 A |
| 4,905,802 | 3/1990 | Gotoh | 192/4 A |

FOREIGN PATENT DOCUMENTS

| | | | |
|---|---|---|---|
| 30783 | 6/1981 | European Pat. Off. | 74/878 |
| 209431 | 1/1987 | European Pat. Off. | 192/4 A |
| 103558 | 4/1989 | Japan | 70/248 |

Primary Examiner—Dwight Diehl
Attorney, Agent, or Firm—Donald F. Scherer

[57] ABSTRACT

The transmission shift range selector is held in a non-drive position by a pawl and rack mechanism until an operator controlled mechanism has been manipulated prior to attempting to shift the range selector.

11 Claims, 3 Drawing Sheets

TRANSMISSION SHIFTER TO OPERATOR CONTROLLED MECHANISM INTERLOCK

TECHNICAL FIELD

This invention relates to control devices for controlling automatic vehicle drive transmissions from one shift range to another. The exemplary embodiment described in this disclosure establishes a latch mechanism which blocks an attempt to shift from a nondrive range to a drive range prior to manipulation of an operator controlled mechanism. The specific manipulation required for the exemplary embodiment is the depressing of the service brake pedal.

BACKGROUND OF THE INVENTION

In many vehicles currently equipped with automatic transmissions, the decision of when to shift from a nondrive range to a drive range is made entirely by the operator of the vehicle. Vehicles equipped with a Park/Lock mechanism block shifting from the Park range until the ignition switch is in the run position. There are no further constraints on shifting of these vehicles based on either the position of the accelerator pedal or the position of the brake pedal.

Prior art devices have been proposed to prevent shifting of a transmission until after the manipulation of an operator controlled mechanism. Two commonly suggested manipulations are the fastening of seat belts and the depressing of the service brake pedal. Prior art devices have also employed solenoids in preventing shifting.

Solenoids have been used to move restricting plates, to link and unlink the shift lever from the rest of the shifter, and to block the motion of the shift linkage by inserting a pin in the linkage path.

SUMMARY OF THE INVENTION

This invention requires a vehicle operator to depress the brake pedal before shifting from a nondrive range to a drive range without modifying the transmission shifter.

The device disclosed here is unique because of its use of a cable locking mechanism as part of a shifter connected cable assembly to prevent the motion of the shifter. The advantage of this invention, over the prior art, is that it can be integrated into a shift linkage system with a minimum of change to the system. Only the cables, and not individual shifters, need to be modified. The same cable design can be used for a number of different styles of shifter assemblies corresponding to different types of vehicles; only the length of the cable being changed. This eliminates the need to provide an entirely new series of shifters redesigned to accommodate a solenoid system.

It is an object of this invention to provide a control for shifting an automatic transmission, which requires at least one operator controlled mechanism to be manipulated prior to allowing the transmission to be shifted from a nondrive range to a drive range by locking a control cable in a fixed position, thereby restricting the operator's ability to change the shift range of the transmission.

It is also an object of this invention to provide a control for shifting an automatic transmission requiring at least one operator controlled mechanism to be manipulated prior to allowing the transmission to be shifted from a nondrive range to a drive range by locking a control cable in a fixed position, wherein a toothed rack attached to the cable and a pawl which engages the teeth of the rack thereby restricting the operator's ability to change the shift range of the transmission.

It is a further object of this invention to provide a control for shifting an automatic transmission which requires at least one operator controlled mechanism to be manipulated prior to allowing the transmission to be shifted from a nondrive range to a drive range by locking a control cable in a fixed position, wherein a solenoid controlled rack and pawl lock the cable, thereby restricting the operator's ability to change the shift range of the transmission.

It is yet a further object of this invention to provide a control for shifting an automatic transmission which requires that the service brake be applied prior to allowing the transmission to be shifted from a nondrive range to a drive range by locking a position selector cable in a fixed position through selective operation of a toothed rack attached to the cable and a pawl which engages the teeth of the rack, and further wherein the pawl engagement is controlled by a solenoid, thereby restricting the shift range of the transmission prior to actuation of the brakes which cause energization of the solenoid.

These and other objects and advantages will be more apparent from the following description and drawings.

DESCRIPTION OF THE PREFERRED EMBODIMENT

Figure 1:
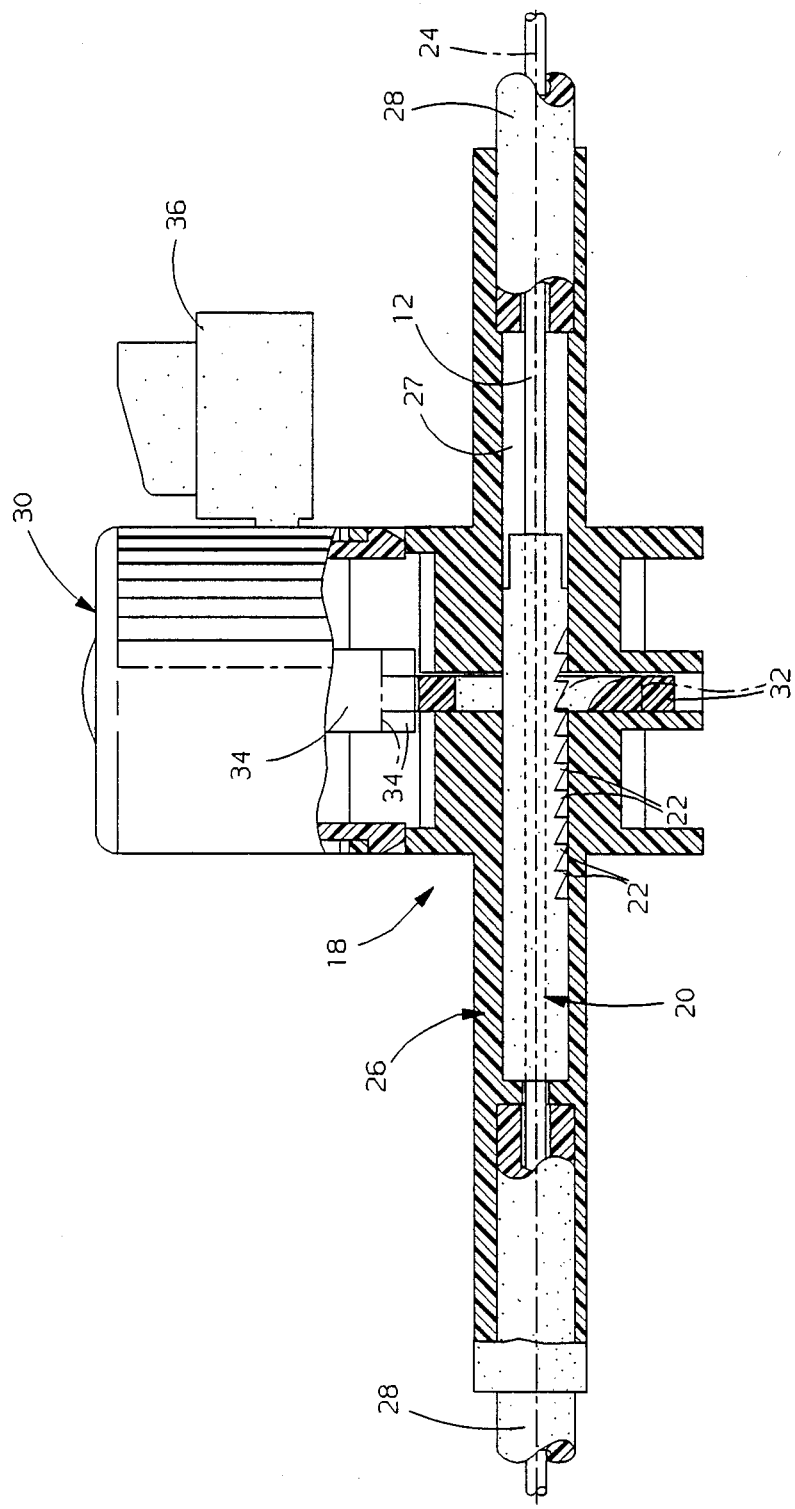
FIG. 1 is a sectional view of a locking mechanism emboding the present invention.

The accompanying drawings illustrate one representative form of an operator controlled transmission shift range position selector mechanism, which is capable of preventing the transmission from being shifted from the Park range prior to depressing the service brake pedal.

An ignition switch interlock mechanism 10, like that disclosed in U.S. Pat. No. 4,270,624 issued June 2, 1981, to Jessop, or U.S. Pat. No. 4,296,847 issued Oct. 27, 1981, to Arndt, both assigned to the assignee of this disclosure, has a cable 12 which links it to a transmission shifter 14. The shifter 14 is capable of placing the transmission into the following ranges: P (park); R (reverse gear); N (neutral); OD (overdrive—low gear to overdrive gear); D (drive—low gear to direct gear); 2 (low gear to second gear); and L (low gear). The specific part of the shifter 14 to which the cable 12 is attached is a park lock mechanism 16 like that disclosed in U.S. Pat. No. 4,474,085 issued Oct. 2, 1984, to DeVogelaere et al. and assigned to the assignee of this disclosure. The cable 12 is enclosed for most of its length by a protective conduit 28. Integrated into or otherwise operatively connected with the cable 12 is an interlock or latching mechanism 18. The cable 12 may pass through a common self-adjusting mechanism (not shown) for altering the effective length of the conduit 28 into which the interlock mechanism 18 would be integrated.

The interlock mechanism 18 comprises a number of elements. Primary among these is a toothed rack 20 attached to the cable 12. The teeth 22 of the rack 20 are uniform in shape and size and are oriented perpendicular to a longitudinal axis 24 of the cable 12. The rack 20 has a uniformly rectangular cross section transverse to the axis 24 of the cable 12. The rack 20 and cable 12 pass through a rigid sleeve 26 which encloses the rack 20 the full distance of its travel. A cavity 27 inside of the sleeve 26 has a rectangular cross section which provides clearance for the rack 20, and allows axial travel of the rack 20 within the sleeve 26. The protective conduit 28 covers the cable 12 beyond the rigid sleeve 26. The protective conduit 28 is attached to both ends of the rigid sleeve 26. The rigid sleeve 26 and protective conduit 28 are fixed relative to the vehicle. A solenoid 30 is attached to the rigid sleeve 26. An engagement pawl 32 is attached to a displacement shaft 34 of the solenoid 30.

Relative displacement between the sleeve 26 and the vehicle may occur during the adjusting process if the self-adjusting mechanism is integrated into the sleeve 26 or the conduit 28. Depending on the mounting configuration selected, there may also be relative motion between the solenoid 30 and the sleeve 26 during self-adjusting. The sleeve 26 and solenoid 30 will remain fixed relative to the vehicle during normal operation of the system after adjustment has occurred.

Figure 2:
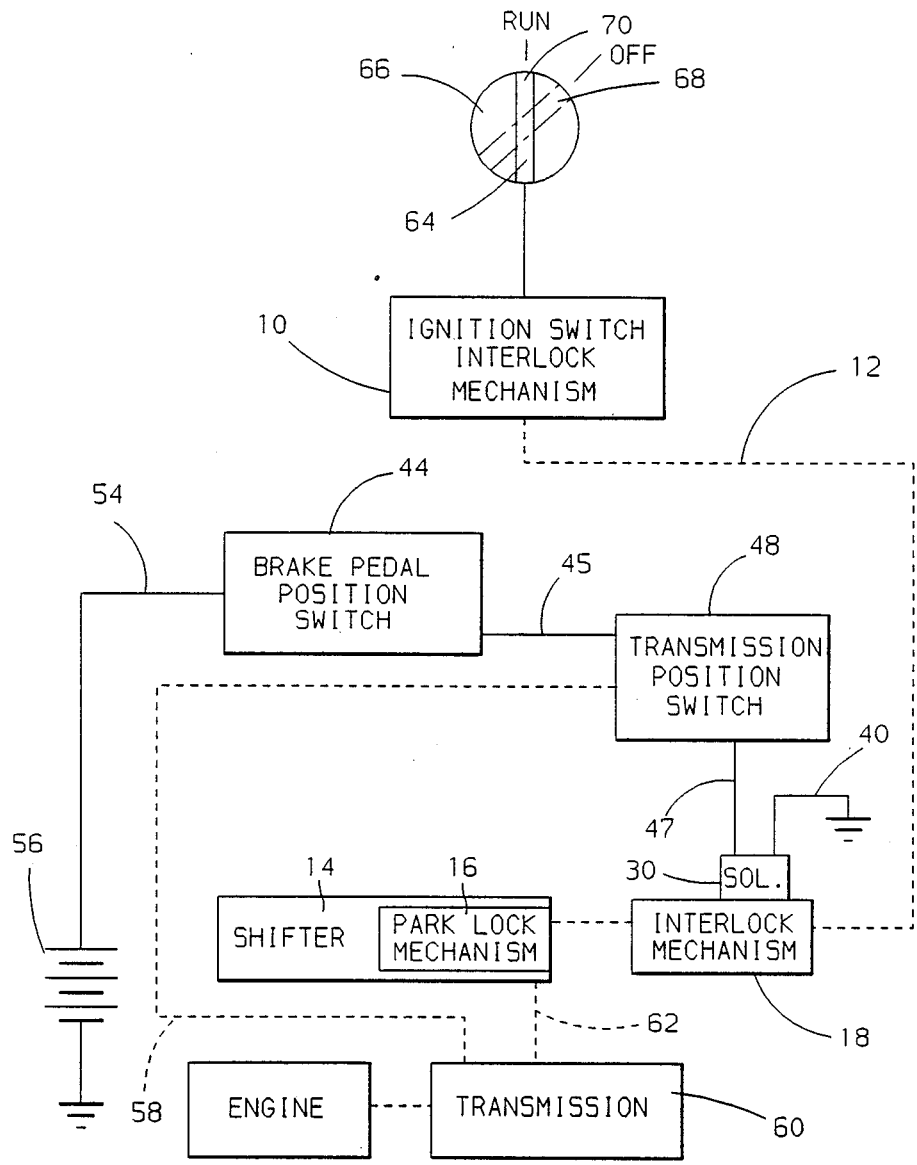
FIG. 2 a schematic representation of a control employment with the exemplary embodiment of the invention.

The solenoid 30 is electrically connected, as shown in FIG. 1 and FIG. 2, through its electrical connector 36 by a wire 47 to a transmission position switch 48 which is electrically connected by a wire 40 to a brake position switch 44. The brake pedal position switch 44 is electrically connected to a voltage source 56 by a wire 54.

Figure 3:
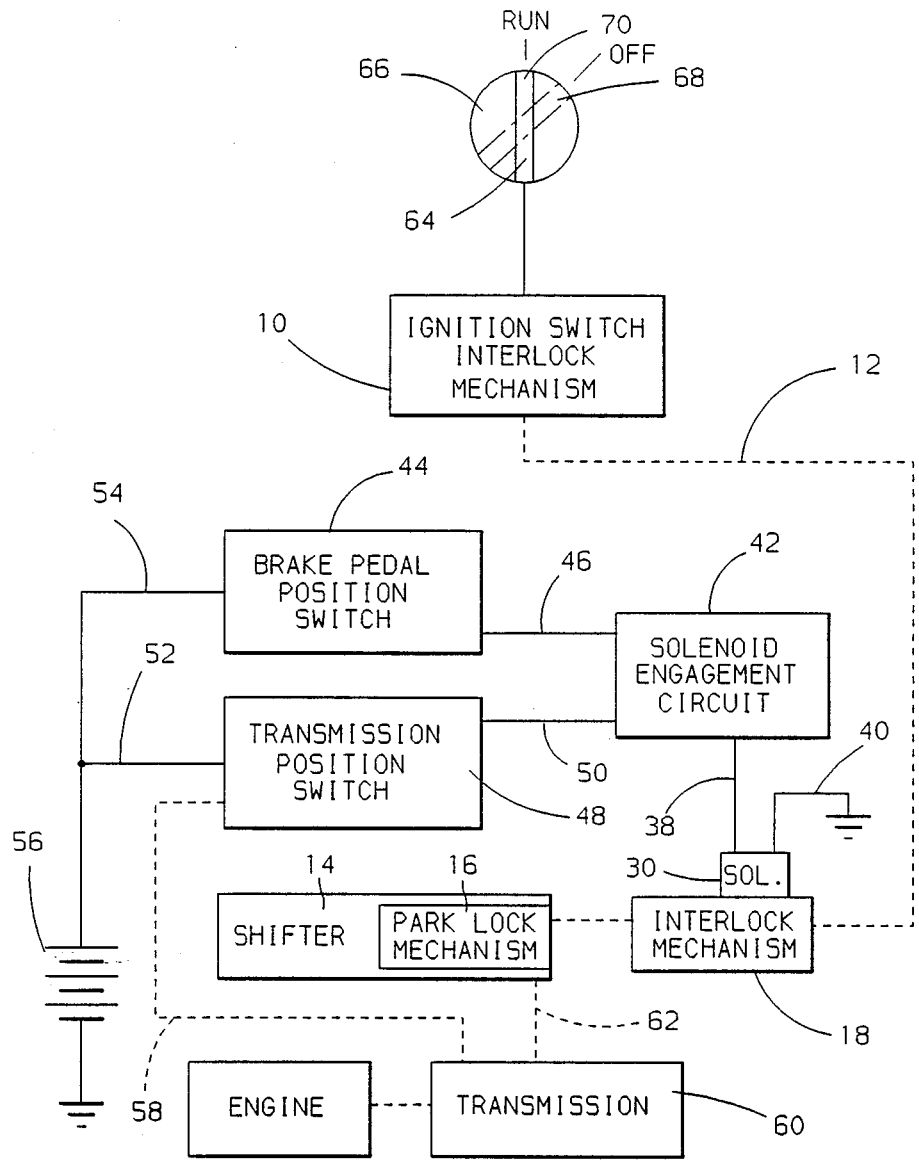
FIG. 3 is a schematic representation of an alternative control employable with the embodiment of the present invention.

Alternately, as shown in FIG. 1 and FIG. 3, the solenoid 30 is electrically connected through its electrical connector 36 and by a wire 38 to a conventional solenoid engagement circuit 42 and by a second wire 40 to ground. The solenoid engagement circuit 42 is, in turn, electrically connected to both a brake pedal position switch 44 by a wire 46, and to a transmission position switch 48 by a wire 50. The transmission position switch 48 and the brake pedal position switch 44 are electrically connected by wires 52 and 54 to a voltage source 56.

The brake pedal position switch 44 employed may be the same as the one disclosed in U.S. Pat. No. 4,257,503 issued Mar. 24, 1981, to Lutnick, and assigned to the assignee of this disclosure. A neutral start switch can be used as the transmission position switch 48. Neutral start switches are well known and widely used with automatic transmissions. The transmission position switch 48 has a link 58 to the transmission 60. The shifter 14 has a link 62 connecting it to the transmission 60.

When the operator (not shown) of the vehicle (not shown) attempts to move the shifter 14 out of the Park range into a drive range, he will not be able to do so unless a key 64 in an ignition switch 66 has been turned from an off position 68 to a run position 70. This blocking of the shifting will be effected by the park lock mechanism 16 in the shifter 14 interacting with the ignition switch interlock mechanism 10 through the connecting cable 12 in a well known manner commonly used in vehicles. The park lock mechanism 16 prevents shifting out of the Park range when the cable 12 is restrained from moving out of the lock position. Turning the key 64 in the ignition switch 66 to the run position 70 places the ignition switch interlock mechanism 10 in the released position, freeing the cable 12 to move. The cable 12 will still be in the lock position, but the cable 12 will not be mechanically locked by the ignition switch interlock mechanism 10.

The interlock mechanism 18 holds the cable 12 in the lock position so that the shifter 14 cannot be moved from the Park range unless the brake pedal is depressed. When the ignition key 64 has been turned to the run position 70, the shifter 14 is in the Park range, and the brake pedal (not shown) is not depressed, the solenoid 30 is energized, lifting the pawl 32 into contact with the teeth 22 of the rack 20, locking the cable 12. This engagement prevents the cable 12 from being moved, and the shifter 14 from being shifted out of the Park range.

In the arrangement shown in FIG. 2, the solenoid 30 remains energized while the the shifter 14 is in the Park range, blocking the shifter 14 from being moved, until the brake pedal is depressed. The transmission position switch is closed in the Park range. The brake pedal position switch remains closed until the brake pedal is depressed. When the brake pedal position switch opens, the flow of electrical current to the solenoid is interrupted, allowing the shifter to be moved into a drive range. The transmission position switch is open when the transmission is in a drive range. The solenoid will not be energized while the transmission shifter is in a drive range.

In the alternate arrangement shown in FIG. 3, the solenoid engagement circuit 42 provides the energizing voltage to the solenoid 30 when the signal from the brake pedal switch 44 indicates that the brake pedal is not depressed, and the voltage from the transmission position switch 48 indicates that the transmission 60 is in the Park range. When the brake pedal is depressed while the shifter 14 is in the Park range, the signal from the brake pedal position switch 44 is altered, resulting in the engagement circuit 42 terminating the flow of electrical current to the solenoid 30, resulting in the release of the park lock cable 12, thereby releasing the shifter 14 from the Park range. When the electrical signal from the transmission indicates that the transmission is in a drive range, the engagement circuit 42 does not transmit electrical current to the solenoid 30.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A control for shifting an automatic transmission which requires at least one operator controlled mechanism to be manipulated prior to the transmission being shifted from a nondrive range to a drive range comprising:

position selector means movable to control setting of said transmission;

cable means attached on one end to said position selector;

lock means operatively connected with said cable means and further comprising a toothed rack fixed to said cable having a plurality of teeth oriented perpendicular to a longitudinal axis of said cable and a pawl disposed for engagement with said teeth of said toothed rack by moving perpendicular to said axis of said cable;

said lock means being engaged to fix said cable means, thereby fixing said position selector means, when said transmission is in said nondrive range prior to manipulation of said operator controlled mechanism; and control means for actuating said lock means.

2. A control for shifting an automatic transmission as claimed in claim 1, said control means comprising:

electromagnetic solenoid means which is energized by a signal produced when said operator controlled mechanism is not manipulated and said transmission is in a nondrive range, to force said pawl and said toothed rack into engagement.

3. A control for shifting an automatic transmission as claimed in claim 2 with a circuit that transforms signals from an operator controlled mechanism position switch and a transmission position switch into a level of voltage suitable for energizing said solenoid means when said signals indicate said transmission is in a nondrive range prior to manipulation of an operator controlled mechanism, further comprising:

said transmission position switch means for providing a signal to indicate when said transmission is in one of said drive range and said nondrive range; and said switch means for said operator controlled mechanism capable of providing a signal to indicate when said operator controlled mechanism is being manipulated.

4. A control for shifting an automatic transmission as claimed in claim 2 with an operator controlled mechanism position switch and a transmission position switch which conducts electric current sufficient to energize said solenoid means when said transmission is in a nondrive range prior to manipulation of an operator controlled mechanism, further comprising:

said transmission switch, open when said transmission is in said drive range and closed when said transmission is in said nondrive range; and said switch for said operator controlled mechanism, closed when said operator controlled mechanism is not being manipulated and open when said operator controlled mechanism is being manipulated.

5. A control for shifting an automatic transmission which requires at least one operator controlled mechanism to be manipulated prior to the transmission being shifted from a nondrive range to a drive range comprising:

position selector means movable to control setting of said transmission;

cable means attached on one end to said position selector;

lock means operatively connected with said cable means and further comprising a toothed rack fixed to said cable having a plurality of teeth oriented perpendicular to a longitudinal axis of said cable and a pawl disposed for engagement with said teeth of said toothed rack by movement of the rack in a direction perpendicular to said axis of said cable;

said lock means being engaged to fix said cable means, thereby fixing said position selector means, when said transmission is in said nondrive range prior to manipulation of said operator controlled mechanism; and control means for actuating said lock means.

6. A control for shifting an automatic transmission as claimed in claim 5, said control means comprising:

electromagnetic solenoid means which is energized by a signal produced when said operator controlled mechanism is not manipulated and said transmission is in a nondrive range, to force said pawl and said toothed rack into engagement.

7. A control for shifting an automatic transmission as claimed in claim 6 with a circuit that transforms signals from an operator controlled mechanism position switch and a transmission position switch into a level of voltage suitable for energizing said solenoid means when said signals indicate said transmission is in a nondrive range prior to manipulation of an operator controlled mechanism, further comprising:

said transmission position switch means for providing a signal to indicate when said transmission is in one of said drive range and said nondrive range; and said switch means for said operator controlled mechanism capable of providing a signal to indicate when said operator controlled mechanism is being manipulated.

8. A control for shifting an automatic transmission as claimed in claim 6 with an operator controlled mechanism position switch and a transmission position switch which conducts electric current sufficient to energize said solenoid means when said transmission is in a nondrive range prior to manipulation of an operator controlled mechanism, further comprising:

said transmission position switch, open when said transmission is in said drive range and closed when said transmission is in said nondrive range; and said switch for said operator controlled mechanism, closed when said operator controlled mechanism is not being manipulated and open when said operator controlled mechanism is being manipulated.

9. A control for shifting an automatic transmission which requires at least one operator controlled mechanism to be manipulated prior to the transmission being shifted from a nondrive range to a drive range comprising:

position selector means movable to control setting of said transmission;

cable assembly means having a cable and a protective conduit covering the cable, the conduit limiting travel of the cable to a single axis substantially coincident with the center of the conduit, the protective conduit fixed in place, the cable functionally attached to said position selector;

lock means operatively connected with said cable means and further comprising a toothed rack fixed to said cable and having a plurality of teeth oriented perpendicular to said axis of said cable, a rigid sleeve interrupting and attached to said protective conduit, the sleeve housing and supporting a portion of said cable and said toothed rack, and the sleeve being stationary during the operation of said lock means, and pawl means operatively connected with the sleeve and being disposed therein for movement perpendicular to said axis of said cable for engaging said teeth thereby preventing movement of said cable in one direction;

said lock means being selectively engageable to fix said cable means, thereby fixing said position selector means, when said transmission is in said nondrive range prior to manipulation of said operator controlled mechanism.

10. A control for shifting an automatic transmission as claimed in claim 9, further comprising:

electromagnetic solenoid means operatively connected with said pawl and being selectively energized by a signal produced when said operator controlled mechanism is unmanipulated and said transmission is in a nondrive range, to force said pawl to engage said toothed rack.

11. A control for shifting an automatic transmission with an operator controlled mechanism position switch and a transmission position switch which conducts electric current sufficient to energize a solenoid means when said transmission is in a nondrive range prior to manipulation of an operator controlled mechanism, compromising:

position selector means movable to control setting of said transmission;

cable assembly means with a first end and a second end, functionally interposed between and attached to said position selector and said automatic transmission or another functional part such as an ignition interlock mechanism, with a cable attached to said position selector on the first end and to a transmission shift shaft lever at said transmission or the operative interface point of the other functional part on the second end, having a protective conduit covering the cable itself, said conduit limiting travel of the cable to a single axis approximately coincident with the center of the conduit, said protective conduit fixed at one of the ends relative to the vehicle;

a toothed rack fixed to said cable and having a plurality of teeth oriented perpendicular to said axis of said cable;

a rigid sleeve, fixed relative to said shifter control while said solenoid is energized, interrupting and fixed to said cable protective conduit, inside which said cable and said toothed rack can freely move along in the axial direction of said cable and with provisions for a pawl which engages said teeth of said toothed rack;

pawl means operatively connected with said sleeve and being disposed therein for movement perpendicular to said axis of said cable thereby preventing movement of said cable;

said electromagnetic solenoid means operatively connected with said pawl end, being selectively energized by a signal produced when said operator controlled mechanism is unmanipulated and said transmission is in a nondrive range, forces said pawl to engage said toothed rack thereby fixing said cable means, in turn fixing said position selector means;

said transmission position switch, open when said transmission is in said drive range and closed when said transmission is in said nondrive range; and said switch means for said operator controlled mechanism, closed when said operator controlled mechanism is not being manipulated and open when said operator controlled mechanism is being manipulated.

* * * * *